UNITED STATES PATENT OFFICE.

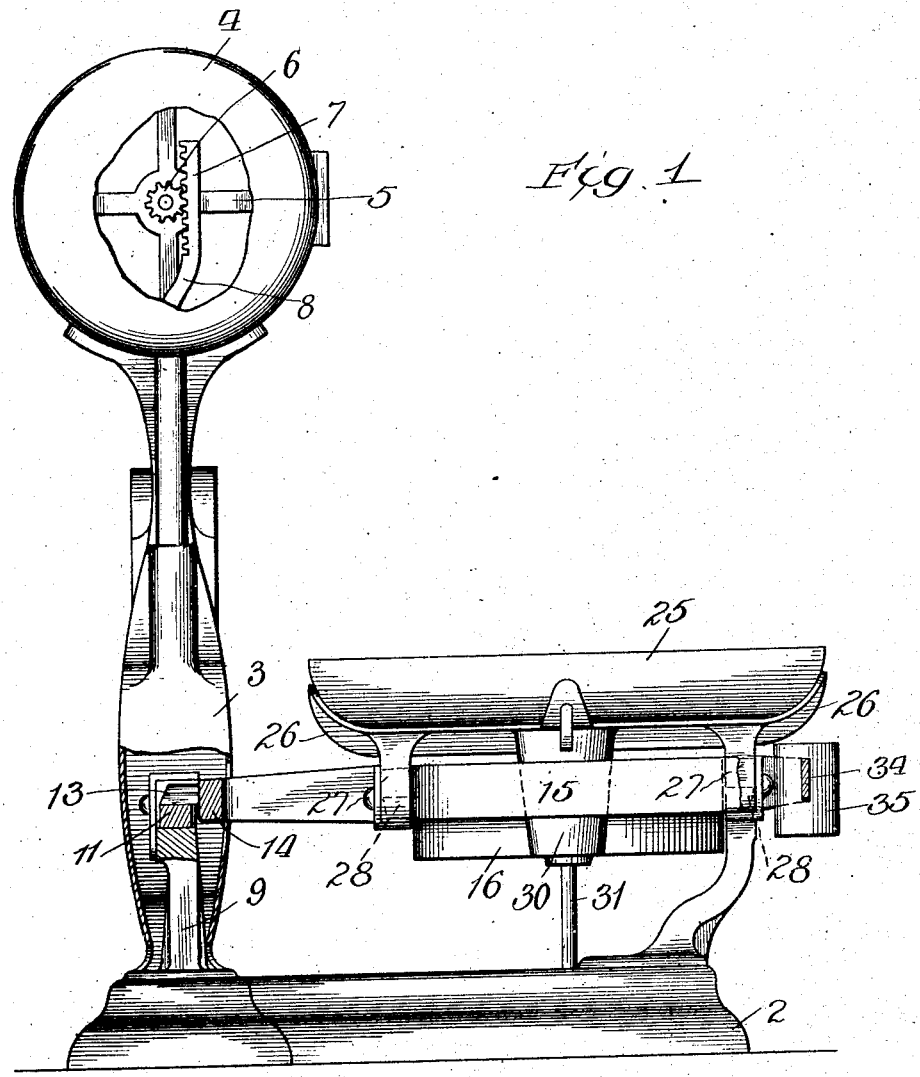

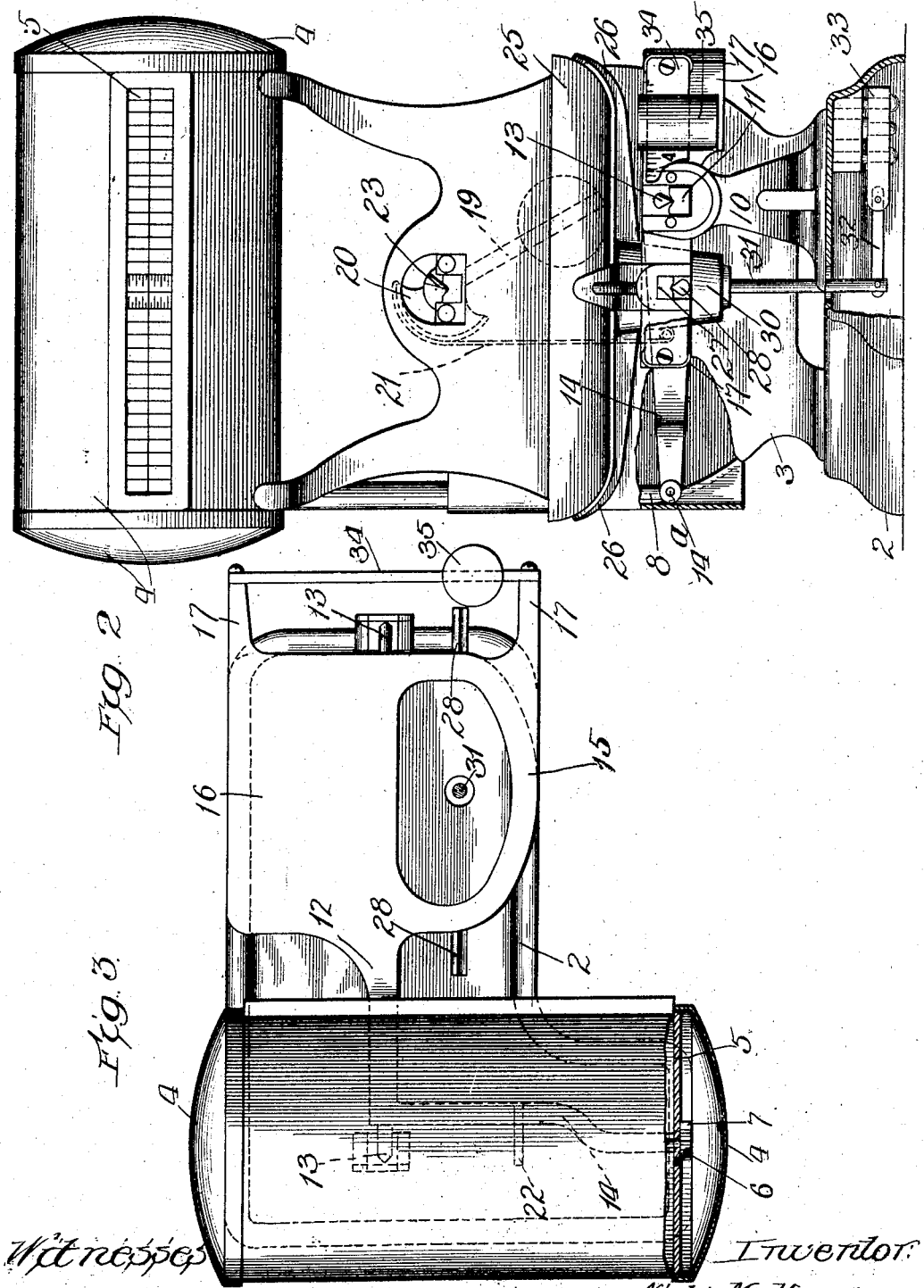

NIELS M. HANSEN, OF DUNDEE, MICHIGAN, ASSIGNOR TO TOLEDO COMPUTING SCALE COMPANY, OF TOLEDO, OHIO, A CORPORATION OF NEW JERSEY.

WEIGHING-SCALE.

No. 917,293.   Specification of Letters Patent.   Patented April 6, 1909.

Application filed September 11, 1906. Serial No. 334,135.

*To all whom it may concern:*

Be it known that I, NIELS M. HANSEN, a citizen of the United States, residing at Dundee, in the county of Monroe and State of Michigan, have invented certain new and useful Improvements in Weighing-Scales, of which the following is a specification.

One object of the present invention is to provide an arrangement whereby the commodity to be weighed can be placed immediately in front of the indicator to impose weight upon a scale beam so fulcrumed that its connection with a pendulum swinging from side to side below the indicator will not require leveling adjustments of the scale in more than one direction. Where the scale beam is fulcrumed to vibrate in a plane at right angles to that in which the pendulum swings, it is obvious that leveling adjustments are required in two different directions.

The present invention avoids the difficulties attendant upon securing the exact leveling of the scales when two different adjustments have to be made, by providing for vibration of the scale beam in a plane parallel with that in which the pendulum swings. By fulcruming a scale beam in this manner, a portion of it can be brought to the desired position out in front of the indicator where it is preferable to support a scale pan or other receptacle for commodities being weighed, while there may be provided an inner portion lying immediately below the pendulum for operative connection therewith. Another advantage of such an arrangement is that lateral or torsional strains are avoided in the connection between the beam and the pendulum.

The invention also aims to provide an arrangement of parts in a scale whether of pendulum or spring balance type whereby the scale pan or platter can be located as desired immediately in front of the indicator upon a scale beam not exceeding in length the lateral dimensions of the scale pan and indicator, and whereby leverage in the scale beam does not require to be taken into account when determining the degree of resistance in the counterbalancing means.

A further object is to provide for accommodating a tare beam at a location where it will be plainly visible and immediately accessible, viz., across the front of a scale-beam of the character heretofore indicated.

With the above stated and incidental objects in view the invention consists in certain novel features of construction and combinations of parts, the essential elements whereof are recited in the appended claims and the preferred form of embodiment of which is illustrated in detail in the accompanying drawings and fully described hereinafter.

Of said drawings, Figure 1 represents in left side elevation, scales having the improvements of the present invention, some parts being broken away and others shown in section; Fig. 2 represents the scales in front elevation, also with some parts broken away and others appearing in section; and Fig. 3 represents a top plan view with the scale pan and appurtenances removed and a portion of the indicator casing broken away.

In these drawings, the reference numeral 2 designates a suitable base from the rear portion of which rises a hollow standard 3, surmounted by a cylindrical casing 4. Within the latter there is journaled a drum 5 having upon its surface a table of computations and a centrally located weight scale, such as commonly employed in computing scales of the so-called barrel type. A pinion 6 is secured to the journal of the drum at one end and a rack 7 intermeshes with said pinion and the strip or bar 8 on which said rack is formed extends down through a tubular part of the standard 3 to a point at the lower portion of the latter, as shown in Fig. 2. Within the hollow standard 3 and at the outer part of the base 2, uprights 9 and 10 are erected, which uprights are bifurcated at their upper ends to receive bearing blocks 11. The scale beam comprises an axially elongated central portion 12 carrying at opposite ends knife-edge bearing projections 13 resting in the notches of the blocks 11, respectively, a radially projecting arm 14 at the inner end pivotally connected at 14ᵃ with the lower end of the rack bar 8, a frame-like portion 15 projecting in the same direction as said arm 14 but from the outer or front part of the scale beam, a weighted portion 16 projecting on the opposite side of the axial line of the beam to about the same extent as said frame-like portion 15, and arms 17 projecting outwardly from the front ends of said frame-like portion and said weighted portion, respectively. A pendulum 19 is swung within the hollow standard 3 centrally below the cylindrical casing 4 and is compounded with a segment 20, and a strap 21 overlies the peripheral portion of said segment and is secured to the latter, said strap depending for connection with a pin 22 projecting inwardly from the arm 14. The pendulum is fulcrumed at 23 to swing from side to side and it will be seen that the described arrangement of the scale beam provides for its vibrating in a plane parallel to that in which said pendulum swings. Said pin 22 is directly below the segment 20 and it will be obvious that this arrangement of the scale beam in relation to the pendulum and this location of said pin will entirely obviate any lateral or torsional strain upon the connecting strap 21. Furthermore, a single sidewise leveling adjustment of the scale will suffice for simultaneously regulating the scale beam and the pendulum.

The scale pan 25 is supported in a spider 26 which is equipped with bearing blocks 27 resting upon knife-edge bearing projections 28 of the frame-like portion 15 of the scale beam and said spider has a central boss 30 with a depending stem 31 passing loosely through the base in a well known manner and connected by a radius link 32 with an adjustable block 33.

It will be noted that the scale beam is not required to exceed in length the lateral dimensions of the scale pan and the indicator drum, and thus a highly desirable compactness of parts is attained which adapts it for use in limited quarters on crowded counters.

While the invention is here shown as embodied in pendulum scales it is obvious that it can be utilized to great advantage in spring scales. The construction and arrangement of scale beam will be seen to provide for applying resistance means, either weight or spring, without necessarily taking into account any leverage in the scale beam. Such resistance means can be connected at exactly the same distance from the fulcrum of the beam as the load is located. Such being the case the location of the scale pan can be as far forward as desired without in the least affecting the resistance means.

A tare beam 34 is secured to the arms 17 and a tare weight 35 slides upon said beam. It will thus be seen that an additional advantage of the invention is to provide for locating a tare beam at the most convenient and accessible place.

The weighted portion 16 of the scale beam performs the usual counterbalancing function and the tare weight 35 operates in the customary manner to overbalance the scales when tare is to be accounted for, as for example the weight of a receptacle placed in the scale pan to receive the commodity being weighed.

While the invention as here shown is applied to the so called barrel type of scales, it is not necessarily limited to such application, as the pendulum may be connected with other known forms of indicating means whereby weight and total price are ascertained.

What is claimed is:

1. In weighing scales, the combination of a single axially elongated scale beam having a radially projecting load-supporting portion and on the same side of its axis as the latter a similarly projecting portion, automatic load-counterbalancing means connected with the last-mentioned portion of the scale beam, indicating means located above and operatively connected with this same portion of the beam, and a goods-receiver mounted on the first-mentioned radially projecting portion of the beam, and centrally located with reference to the indicating means; substantially as described.

2. The combination of an indicator, a pendulum swinging below the same, a scale beam vibrating in a plane parallel with that in which said pendulum vibrates, and extending from a point in vertical alinement therewith outwardly in front of the indicator where it is equipped to support the commodity being weighted, and an operating connection between the inner side of said scale beam and the pendulum.

3. The combination of an indicator, a pendulum swinging below the same, a scale beam fulcrumed to vibrate in parallelism with said pendulum and axially elongated to extend from a point immediately below the pendulum outwardly in front of the indicator where it is equipped to support the commodity being weighed, and an operating connection between the inner side of said scale beam and the pendulum.

4. The combination of an indicator, a pendulum swinging below the same, a scale beam vibrating in a plane parallel with that in which said pendulum vibrates, and extending from a point in vertical alinement therewith outwardly in front of the indicator where it is equipped to support the commodity being weighed, a segment compounded with the pendulum, and a strap connecting the segment with the inner side of the scale beam.

5. The combination of a casing, a drum or cylinder journaled therein, a pendulum swinging below the same, a scale beam vibrating in a plane parallel with that in which said pendulum vibrates and extending from a point in vertical alinement therewith outwardly in front of the indicator where it is equipped to support the commodity being weighed, an operating connection between the inner side of said scale beam and the pendulum, and an operating connection between that side of the scale beam and the drum.

6. The combination of a casing, a drum or cylinder journaled therein and having a gear, a depending rack in mesh with said gear, a pendulum swinging below the cylinder, a scale-beam fulcrumed to vibrate in parallelism with said pendulum and axially elongated to extend from a point immediately below the pendulum outwardly in front of the indicator where it is equipped to support the commodity being weighed, said beam having an inner side arm coupled to the rack, and an operating connection between said arm and the pendulum.

7. The combination of an indicator, a pendulum swinging below the same, a scale beam vibrating in a plane parallel with that in which said pendulum vibrates and extending from a point in vertical alinement therewith outwardly in front of the indicator where it is equipped to support the commodity being weighed, an operating connection between the inner side of said scale beam and the pendulum, and a tare beam extending across the front side of the scale-beam.

8. The combination of an indicator, a pendulum swinging below the same, a scale-beam comprising a central elongated portion with fulcrum members at opposite ends, an arm projecting radially from the rear end of said central portion and fulcrum-bearing portions projecting similarly from the forward part of the beam, a scale pan mounted on said fulcrum-bearing portions of the beam, and an operating connection between the rear arm of the beam and the pendulum.

NIELS M. HANSEN.

Witnesses:
ALLEN DE VILBISS, Jr.,
SETH C. NIXON.